UNITED STATES PATENT OFFICE.

CATHERINE S. PERKINS, OF ROCKVILLE CENTER, NEW YORK.

COMPOSITION OF MATTER FOR USE AS A STARCH.

1,149,216.

Specification of Letters Patent.

Patented Aug. 10, 1915.

No Drawing.

Application filed August 8, 1914. Serial No. 855,722.

*To all whom it may concern:*

Be it known that I, CATHERINE S. PERKINS, a citizen of the United States, and residing at Rockville Center, Long Island, in the county of Nassau and State of New York, have invented a certain new and useful Composition of Matter for Use as a Starch, of which the following is a specification, such as will enable those skilled in the art to which it appertains to make and use the same.

This composition is designed for use as a starch, or starch composition in laundry work, and consists of the following ingredients combined in the proportions stated, namely;—

| | |
|---|---|
| Starch | 6 ounces. |
| Salt | ½ ounce. |
| Borax | ½ ounce. |
| Wax | 5 ounces. |

In preparing this composition for use, the wax is first melted, and while hot, all the other ingredients are mingled therein and dissolved. The product is then allowed to stand until it solidifies and becomes dry, after which it is ground or pulverized to form a finely divided product which is put up in packages for use.

In doing laundry work this composition is used in the same way as ordinary starch and will be found to be much superior to other products of this class, as it will not stick to an iron nor will the iron stick to it, and a smooth and glossy surface is easily produced by the ordinary process of ironing.

My invention is not limited to the exact proportion of the ingredients herein specified, and changes therein may be made, within the scope of the appended claims, without departing from the spirit of my invention or sacrificing its advantages.

Having fully described my invention, what I claim as new and desire to secure by Letters Patent, is:—

1. The herein described starch composition consisting of starch, salt, borax and wax, substantially and in the proportions described.

2. The herein described composition of matter for use as a starch, and consisting of starch six ounces, salt one-half ounce, borax one-half ounce and wax five ounces, substantially as described.

In testimony that I claim the foregoing as my invention I have signed my name in presence of the subscribing witnesses this 6th day of August 1914.

CATHERINE S. PERKINS.

Witnesses:
JOHN LYON,
GEORGE D. BROWER.